(12) United States Patent
Wu

(10) Patent No.: US 10,912,067 B2
(45) Date of Patent: Feb. 2, 2021

(54) DEVICE AND METHOD OF HANDLING COMMUNICATION OPERATIONS WITH CELLS IN TIMING ADVANCE GROUPS

(71) Applicant: HTC Corporation, Taoyuan (TW)

(72) Inventor: Chih-Hsiang Wu, Taoyuan (TW)

(73) Assignee: HTC Corporation, Taoyuan (TW)

( * ) Notice: Subject to any disclaimer, the term of this patent is extended or adjusted under 35 U.S.C. 154(b) by 463 days.

(21) Appl. No.: 15/054,157

(22) Filed: Feb. 26, 2016

(65) Prior Publication Data

US 2016/0255621 A1 Sep. 1, 2016

Related U.S. Application Data

(60) Provisional application No. 62/120,904, filed on Feb. 26, 2015.

(51) Int. Cl.
*H04W 72/04* (2009.01)
*H04L 5/00* (2006.01)
*H04W 56/00* (2009.01)

(52) U.S. Cl.
CPC ....... *H04W 72/0413* (2013.01); *H04L 5/0048* (2013.01); *H04W 56/0045* (2013.01)

(58) Field of Classification Search
CPC .............. H04W 56/00; H04W 56/001; H04W 56/0045; H04W 56/0005; H04W 74/002;
(Continued)

(56) References Cited

U.S. PATENT DOCUMENTS 9,237,537 B2 * 1/2016 Dinan ............... H04W 56/0005
9,609,605 B2 * 3/2017 Dinan ................. H04W 52/365
(Continued)

FOREIGN PATENT DOCUMENTS

CN 102291837 A 12/2011
CN 103037497 A 4/2013
(Continued)

OTHER PUBLICATIONS

Search Report dated Aug. 1, 2016 for EP application No. 16157691. 3, pp. 1-7.
(Continued)

*Primary Examiner* — Hassan Kizou
*Assistant Examiner* — Mahbubul Bar Chowdhury
(74) *Attorney, Agent, or Firm* — Winston Hsu

(57) ABSTRACT

A communication device for handling communication operations with a network comprising a storage unit and a processing means. The processing means is configured to execute instructions stored in the storage unit. The instructions comprise starting a first time alignment timer (TAT) for a pTAG comprising a PCell; starting a second TAT for a first sTAG comprising a PUCCH SCell; releasing PUCCH and SRS for all serving cell(s) of the first sTAG, when the second TAT expires and the first TAT does not expire; being configured a first SCell of the network which belongs to the pTAG or a second sTAG; being configured the first SCell which belongs to a secondary PUCCH group comprising the PUCCH SCell; and releasing PUCCH for the first SCell, when the second TAT expires and the first TAT does not expires.

12 Claims, 7 Drawing Sheets

(58) Field of Classification Search
CPC ......... H04W 74/0833; H04W 72/1284; H04W 72/0413; H04L 5/0048
See application file for complete search history.

(56) References Cited

U.S. PATENT DOCUMENTS

| | | | |
|---|---|---|---|
| 9,655,071 B2 | 5/2017 | Kwon | |
| 9,735,934 B2* | 8/2017 | Futaki | H04L 5/0037 |
| 2012/0250520 A1* | 10/2012 | Chen | H04L 5/001 |
| | | | 370/241 |
| 2012/0257570 A1* | 10/2012 | Jang | H04W 76/19 |
| | | | 370/328 |
| 2012/0300752 A1* | 11/2012 | Kwon | H04W 56/0005 |
| | | | 370/336 |
| 2013/0188620 A1* | 7/2013 | Dinan | H04W 56/0005 |
| | | | 370/336 |
| 2013/0250911 A1* | 9/2013 | Kwon | H04W 56/00 |
| | | | 370/331 |
| 2014/0023055 A1* | 1/2014 | Jeong | H04L 5/001 |
| | | | 370/336 |
| 2015/0245307 A1* | 8/2015 | Chen | H04W 56/0045 |
| | | | 370/336 |
| 2015/0334669 A1* | 11/2015 | Zhang | H04W 56/0045 |
| | | | 370/336 |
| 2016/0044617 A1* | 2/2016 | Vajapeyam | H04W 56/0005 |
| | | | 370/336 |
| 2017/0325188 A1* | 11/2017 | Dinan | H04W 72/04 |
| 2018/0288760 A1* | 10/2018 | Lee | H04L 1/1854 |

FOREIGN PATENT DOCUMENTS

| | | |
|---|---|---|
| CN | 103931243 A | 7/2014 |
| CN | 104067675 A | 9/2014 |

OTHER PUBLICATIONS

Huawei, HiSilicon, "Introduce PUCCH on SCell for CA beyond 5 carriers", 3GPP TSG-RAN WG2 Meeting #89, R2-150372, Feb. 9-13, 2015, Athens, Greece, XP050935662, pp. 1-8.
Intel Corporation, "Considerations for PUCCH on SCell in carrier aggregation", 3GPP TSG RAN WG2 Meeting #89, R2-150169, Feb. 9-13, 2015, Athens, Greece, XP050935517, pp. 1-4.
Ericsson, "Time alignment for Dual Connectivity", 3GPP TSG-RAN WG2 #85bis, Tdoc R2-141162, Mar. 31-Apr. 4, 2014, Valencia, Spain, XP050817749, pp. 1-4.
Office action dated Oct. 4, 2017 for EP application No. 16157691.3, pp. 1-6.
Ericsson, "TAT expiry and reporting at exceeding of max UL transmission timing difference", 3GPP TSG-RAN WG2 Meeting #89, R2-150387, Feb. 9-13, 2014, Athens, Greece, XP050935328, pp. 1-6.
ETSI TS 136 133 V12.6.0, Apr. 2015.
ETSI TS 136 300 V12.4.0 (Feb. 2015).
ETSI TS 136 321 V12.4.0 (Feb. 2015).
ETSI TS 136 331 V12.4.1 (Feb. 2015).
Office action dated Nov. 2, 2018 for the China application No. 201610107902.4, filing date Feb. 26, 2016, pp. 1-6.

* cited by examiner

DEVICE AND METHOD OF HANDLING COMMUNICATION OPERATIONS WITH CELLS IN TIMING ADVANCE GROUPS

CROSS REFERENCE TO RELATED APPLICATIONS

This application claims the benefit of U.S. Provisional Application No. 62/120,904, filed on Feb. 26, 2015, which is incorporated herein by reference.

BACKGROUND OF THE INVENTION

1. Field of the Invention

The present invention relates to a communication device and a method used in a wireless communication system, and more particularly, to a communication device and a method of handling communication operations with a network in a wireless communication system.

2. Description of the Prior Art

A network configures a primary cell (PCell) and a secondary cell (SCell) and a physical uplink control channel (PUCCH) SCell, to a user equipment (UE) to perform a carrier aggregation (CA) operation in a long-term evolution (LTE) advanced (LTE-A) system. That is, the PCell, the SCell and the PUCCH SCell are serving cells for the UE. The network may configure the UE to use the PUCCH SCell to transmit a PUCCH for the SCell. That is, the SCell and the PUCCH SCell belong to a secondary PUCCH SCell group. The SCell and the PUCCH SCell may belong to different timing advance groups (TAGs). However it is not known how to handle a PUCCH transmission for the SCell when a time alignment timer (TAT) for a TAG including the PUCCH SCell expires.

Thus, how to handle communication operations between the UE and the network considering uplink (UL) timing is an important topic to be discussed.

SUMMARY OF THE INVENTION

The present invention therefore provides a communication device and a method for handling communication operations with a network to solve the abovementioned problem.

A communication device for handling communication operations with a network comprising a storage unit for storing instructions and a processing means coupled to the storage unit. The processing means is configured to execute the instructions stored in the storage unit. The instructions comprise establishing a first uplink (UL) time alignment with a primary timing advance group (pTAG) comprising a primary cell (PCell) of the network and starting a first time alignment timer (TAT) for controlling how long the communication device determines that the pTAG is UL time aligned; establishing a second UL time alignment with a first secondary TAG (sTAG) comprising a physical UL control channel (PUCCH) secondary cell (SCell) of the network and starting a second TAT for controlling how long the communication device determines that the first sTAG is UL time aligned; releasing a PUCCH and a sounding reference signal (SRS) for the serving cells of the first sTAG, when the second TAT expires and the first TAT does not expire; being configured a first SCell of the network which belongs to the pTAG or a second sTAG; being configured the first SCell of the network which belongs to a secondary PUCCH group comprising the PUCCH SCell; and releasing a PUCCH for the first SCell of the network, when the second TAT expires and the first TAT does not expire.

A network for handling communication operations with a communication device comprising a storage unit for storing instructions and a processing means coupled to the storage unit. The processing means is configured to execute the instructions stored in the storage unit. The instructions comprise establishing a first uplink (UL) time alignment with the communication device for a primary timing advance group (pTAG) comprising a primary cell (PCell) of the network; establishing a second UL time alignment with the communication device for a first secondary TAG (sTAG) comprising a physical UL control channel (PUCCH) secondary cell (SCell) of the network; receiving a message from the communication device via the PCell or another SCell, wherein the message indicates that a UL time of the communication device is not synchronized with the first sTAG; and transmitting a physical downlink control channel (PDCCH) order to the communication device for triggering the communication device to perform a random access (RA) procedure in response to the message.

A network for handling communication operations with a communication device comprising a storage unit for storing instructions and a processing means coupled to the storage unit. The processing means is configured to execute the instructions stored in the storage unit. The instructions comprise establishing a first uplink (UL) time alignment with the communication device for a primary timing advance group (pTAG) comprising a primary cell (PCell) of the network; establishing a second UL time alignment with the communication device for a first secondary TAG (sTAG) comprising a physical UL control channel (PUCCH) secondary cell (SCell) of the network; and transmitting a physical downlink control channel (PDCCH) order to the communication device for triggering the communication device to perform a random access (RA) procedure, when not receiving any PUCCH transmission on the PUCCH SCell for a period of time or in a number of subframes that the network is configured to receive the PUCCH transmission.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
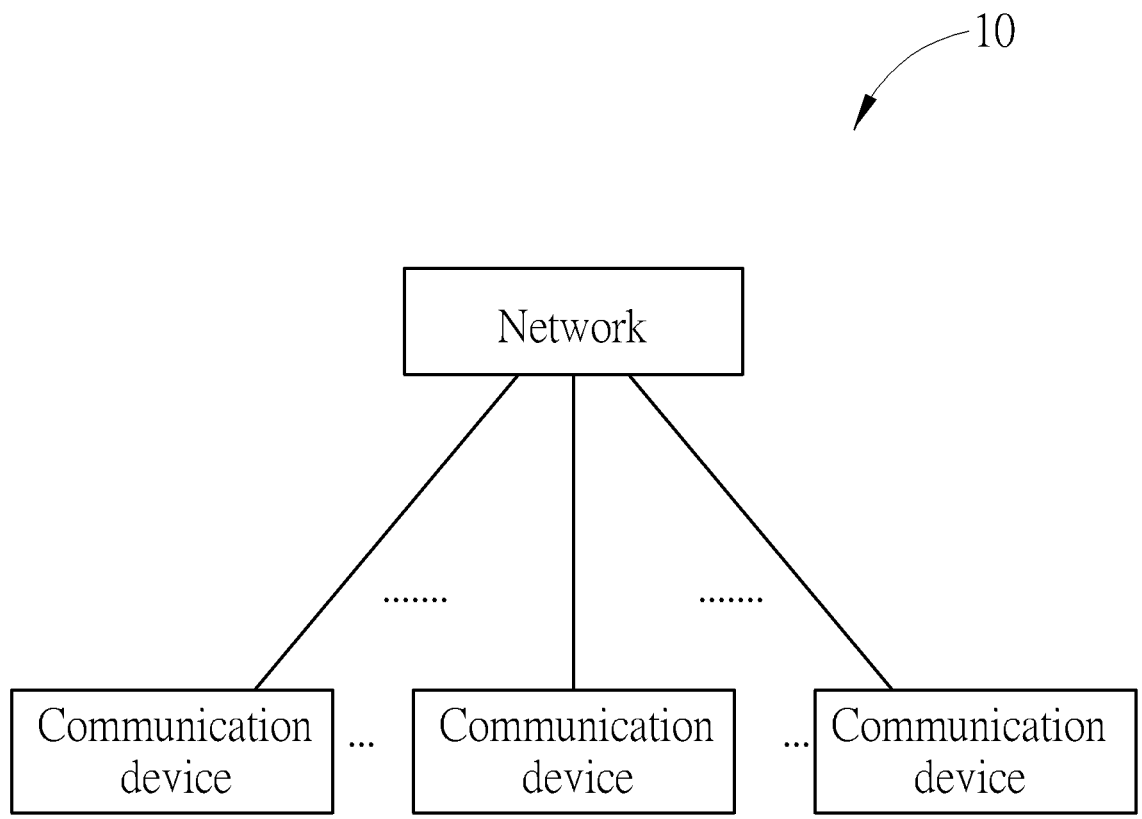
FIG. 1 is a schematic diagram of a wireless communication system according to an example of the present invention.

FIG. 1 is a schematic diagram of a wireless communication system 10 according to an example of the present invention. The wireless communication system 10 is briefly composed of a network and a plurality of communication devices. In FIG. 1, the network and the communication devices are simply utilized for illustrating the structure of the wireless communication system 10. Practically, the network may be an evolved UTRAN (E-UTRAN) including at least one evolved NB (eNB) and/or at least one relay in a long term evolution (LTE) system, a LTE-Advanced (LTE-A) system or an evolution of the LTE-A system.

A communication device can be a user equipment (UE), a low cost device (e.g., machine type communication (MTC) device), a mobile phone, a laptop, a tablet computer, an electronic book, a portable computer system, a vehicle or an aircraft. In addition, the network and the communication device can be seen as a transmitter or a receiver according to direction (i.e., transmission direction), e.g., for an uplink, the communication device is the transmitter and the network is the receiver, and for a downlink (DL), the network is the transmitter and the communication device is the receiver.

Figure 2:
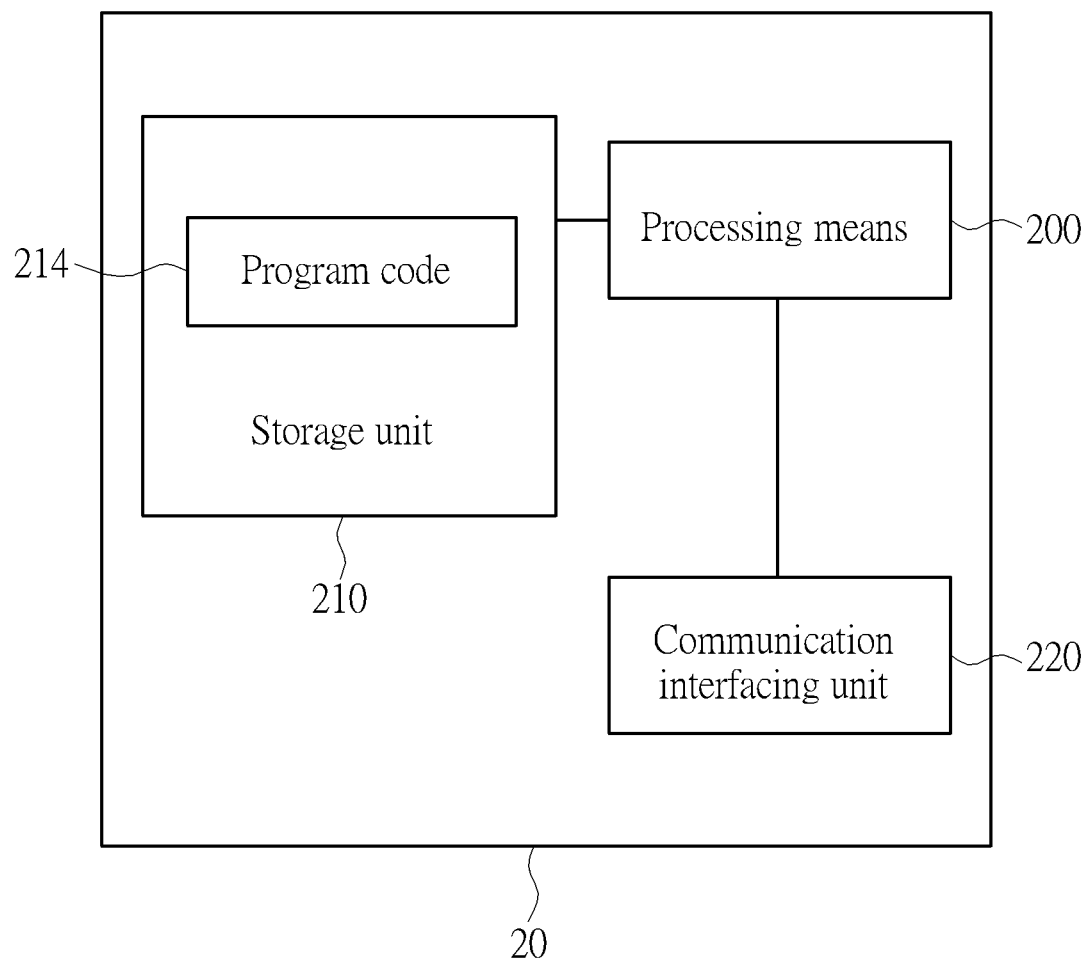
FIG. 2 is a schematic diagram of a communication device according to an example of the present invention.

FIG. 2 is a schematic diagram of a communication device 20 according to an example of the present invention. The communication device 20 may be a communication device or the network shown in FIG. 1, but is not limited herein. The communication device 20 may include a processing means 200 such as a microprocessor or Application Specific Integrated Circuit (ASIC), a storage unit 210 and a communication interfacing unit 220. The storage unit 210 may be any data storage device that may store a program code 214, accessed and executed by the processing means 200. Examples of the storage unit 210 include but are not limited to a subscriber identity module (SIM), read-only memory (ROM), flash memory, random-access memory (RAM), hard disk, optical data storage device, non-volatile storage unit, non-transitory computer-readable medium (e.g., tangible media), etc. The communication interfacing unit 220 is preferably a transceiver and is used to transmit and receive signals (e.g., data, signals, messages and/or packets) according to processing results of the processing means 200. For simplicity, the UE is used to represent the communication device in FIG. 1 in the following embodiments.

Figure 3:
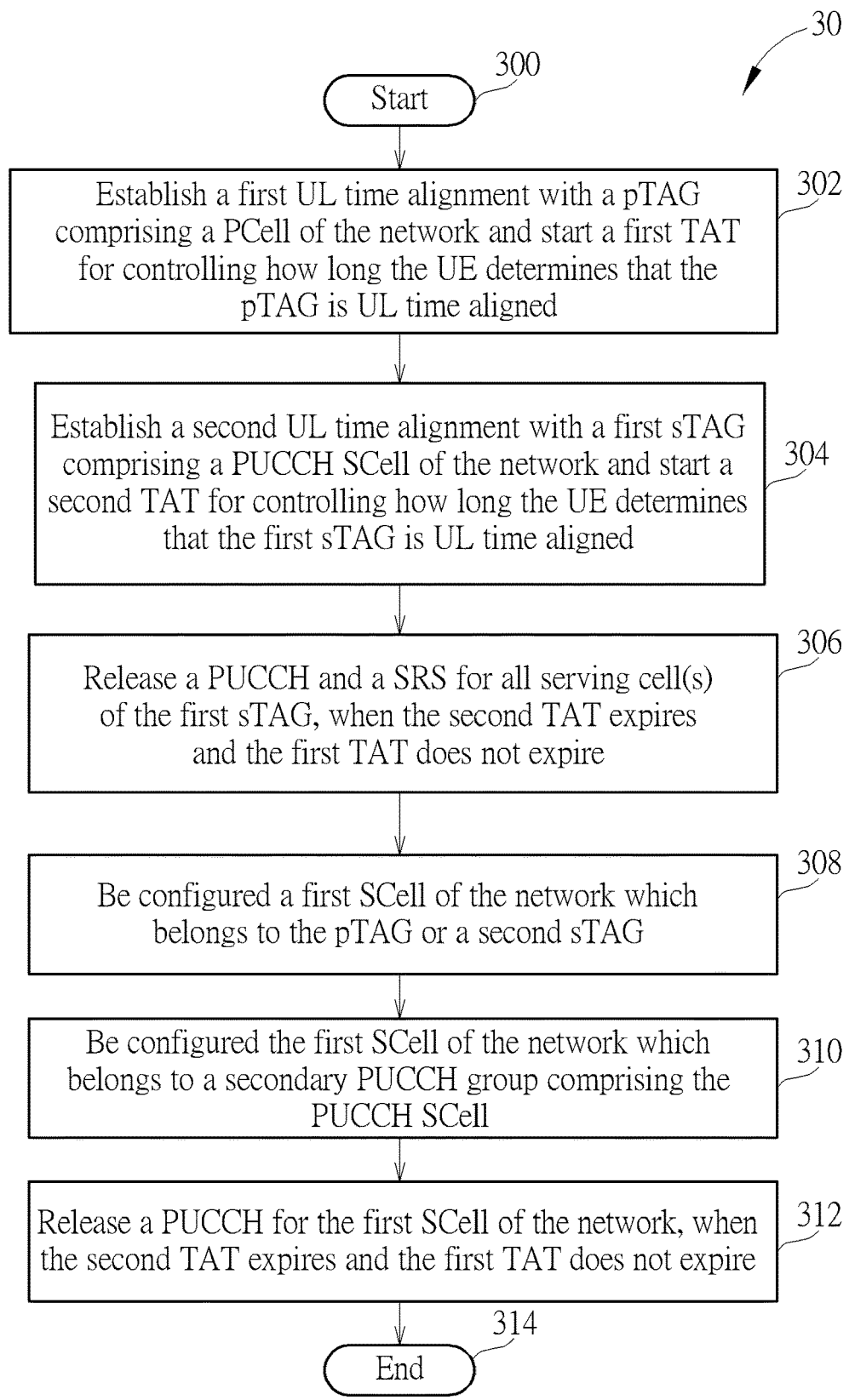
FIG. 3 is a flowchart of a process according to an example of the present invention.

FIG. 3 is a flowchart of process 30 according to an example of the present invention. The process 30 may be utilized in a UE in FIG. 1, to handle communication operations with a network (e.g., eNB) in FIG. 1. The process 30 may be compiled into the program code 214 and includes the following steps:

Step 300: Start.

Step 302: Establish a first uplink (UL) time alignment with a primary timing advance group (pTAG) comprising a primary cell (PCell) of the network and start a first time alignment timer (TAT) for controlling how long the UE determines that the pTAG is UL time aligned.

Step 304: Establish a second UL time alignment with a first secondary TAG (sTAG) comprising a physical UL control channel (PUCCH) secondary cell (SCell) of the network and start a second TAT for controlling how long the UE determines that the first sTAG is UL time aligned.

Step 306: Release a PUCCH and a sounding reference signal (SRS) for all serving cell(s) of the first sTAG, when the second TAT expires and the first TAT does not expire.

Step 308: Be configured a first SCell of the network which belongs to the pTAG or a second sTAG.

Step 310: Be configured the first SCell of the network which belongs to a secondary PUCCH group comprising the PUCCH SCell.

Step 312: Release a PUCCH for the first SCell of the network, when the second TAT expires and the first TAT does not expire.

Step 314: End.

According to the process 30, the UE establishes a first UL time alignment with a pTAG including a PCell of the network and start a first TAT for controlling how long the UE determines that the pTAG is UL time aligned. The UE establishes a second UL time alignment with a first sTAG including a PUCCH SCell of the network and start a second TAT for controlling how long the UE determines that the first sTAG is UL time aligned. Then, the UE releases a PUCCH and a SRS for all serving cell(s) of the first sTAG, when the second TAT expires and the first TAT does not expire. That is, the UE is not UL time aligned with the first sTAG while the UE is UL time aligned with the pTAG. The UE is configured a first SCell of the network which belongs to the pTAG or a second sTAG before the second TAT expires. The UE is configured the first SCell of the network which belongs to a secondary PUCCH group including the PUCCH SCell before the second TAT expires. The UE releases a PUCCH for the first SCell of the network, when the second TAT expires and the first TAT does not expire.

Releasing the PUCCH and the SRS for all serving cell(s) of the first sTAG prevents the UE from transmitting channel state information (CSI) reports and the SRS for the all serving cell(s) in the first sTAG to the network via the PUCCH SCell. Further, releasing the PUCCH for the first SCell prevents the UE from transmitting CSI reports for the first SCell to the network via the PUCCH SCell. That is, the UE is not allowed to transmit the CSI reports for the first SCell, when the second TAT expires and the first TAT does not expire. If the first SCell belongs to the second sTAG, the UE will not be allowed to transmit the CSI reports for the first SCell, when the second TAT expires, the first TAT does not expire and a third TAT of the second TAG does not expire. Thus, the process 30 solves a problem that transmission of the CSI reports on the PUCCH SCell makes interference to transmission of other UEs due to that the UE is not UL synchronized on the PUCCH SCell. The UE may or may not release the SRS for the first SCell if the SRS for the first SCell is configured by the network. The SRS for the first SCell is transmitted by the UE on the first SCell.

Further, the UE may flush all first HARQ buffers for the all serving cell(s) of the first sTAG when the second TAT expires and the first TAT does not expire. The UE may not flush HARQ buffers for the first SCell.

Realization of the present invention is not limited to the above description. The following example may be applied to the process 30.

In one example, the UE may receive a RRCConnectionReconfiguration message configuring the PUCCH SCell of the network. In one example, the UE may perform a first random access (RA) procedure via a cell (e.g. the PUCCH SCell) of the network in the first sTAG to establish the second UL time alignment with the network for the first sTAG. Then, the UE may (re)start the second TAT when receiving a first timing advance command from the network in response to the first RA procedure. In one example, the UE may (re)restart the second TAT, when receiving a second timing advance command from the network without performing a RA procedure.

In one example, the step of flushing the all first HARQ buffers may include that the UE determines that a first UL transmission performed by each HARQ process corresponding to each of the all serving cell(s) in the first sTAG is a new transmission, after the UE is synchronized with the first sTAG. That is, the first UL transmission performed by the each HARQ process is determined as the new transmission, when the UE is UL synchronized with the first sTAG again.

In one example, the step of releasing the PUCCH for the all serving cell(s) of the first sTAG may include that the UE releases a cqi-ReportConfigSCell configuration for each of the all serving cell(s) of the first sTAG. Further, the step of releasing the SRS for the all serving cell(s) of the first sTAG may include that the UE releases a SoundingRS-UL-ConfigDedicated configuration for each of the all serving cell(s) of the first sTAG. In one example, the step of releasing the PUCCH for the first SCell may include that the UE releases a cqi-ReportConfigSCell configuration for the first SCell.

That is, the UE may release the cqi-ReportConfigSCell configuration for the first sTAG and the first SCell, when releasing the PUCCH for the first sTAGs and the first SCell, respectively. The UE may release the SoundingRS-UL-ConfigDedicated configuration for the first sTAG and the first SCell, when releasing the SRS for the first sTAGs and the first SCell, respectively. Please note that, the UE may receive the cqi-ReportConfigSCell in a RRCConnectionReconfiguration message. The UE may receive the SoundingRS-UL-ConfigDedicated in the RRCConnectionReconfiguration message or another RRCConnectionReconfiguration message. That is, the cqi-ReportConfigSCell and the SoundingRS-UL-ConfigDedicated may be transmitted to the UE in the same RCConnectionReconfiguration message or different RRCConnectionReconfiguration messages.

In one example, the UE may transmit a message to the network, wherein the message indicates that UL timing of the UE is not synchronized with the first sTAG. The message may be a physical layer control signal on a PUCCH of the PCell, a medium access control (MAC) control element, or a radio resource control (RRC) message. When the network receives the message, the network may transmit a physical DL control channel (PDCCH) order (i.e., a DL control information on a PDCCH) to trigger the UE to perform a second RA procedure to the PUCCH SCell or a second SCell of the first sTAG, so that the UE can get the UL timing synchronized with the first sTAG. The UE (re) starts the second TAT, when the UE receives a RA response message including a timing advance command. The UE adjusts its UL timing according to a timing adjustment value in the timing advance command.

In one example, the UE may determine that the second TAT expires, when the first TAT expires and the second TAT does not expire. Then, the UE may flush all second HARQ buffers for all serving cell(s) of the pTAG, release a PUCCH and a SRS for the all serving cell(s) of the pTAG, and release the PUCCH and the SRS for the all serving cell(s) of the first sTAG.

In addition, the UE may determine that TATs for other sTAGs expire, when the first TAT expires. Further, the UE may flush all HARQ buffers, and release a PUCCH and a SRS for all serving cell(s) of the other sTAGs. Please note that, the UE does not determine that the first TAT expires, when the second TAT expires. That is, the UE does not flush HARQ buffers and does not release the PUCCH and the SRS for all serving cells of the pTAG and other sTAGs except the first sTAG, when the second TAT expires.

In one example, the step of releasing the PUCCH for the all serving cell(s) of the pTAG includes that the UE releases a cqi-ReportConfigSCell configuration for the each of the all serving cell(s) of the pTAG, and releases a schedulingRequestConfig for the PCell, if the UE is configured with the schedulingRequestConfig for the PCell. Further, the step of releasing the SRS for each of the all serving cell(s) of the pTAG may include that the UE releases a SoundingRS-UL-ConfigDedicated configuration for each of the all serving cell(s) of the pTAG.

In one example, the UE may clear all configured DL assignments and/or UL grants of a cell of a TAG (e.g. pTAG or sTAG) if a TAT for the TAG expires. In one example, the step of releasing the PUCCH for the first sTAG may include that the UE releases a schedulingRequestConfig for the PUCCH SCell, if the UE is configured with the schedulingRequestConfig for the PUCCH SCell.

It is noted that the cqi-ReportConfigSCell, SoundingRS-UL-ConfigDedicated and schedulingRequestConfig are RRC configurations. Once the UE releases a RRC configuration due to UL not time aligned, the RRC configuration is no longer valid even when the UE gets UL time aligned. The CSI report includes channel quality indication (CQI) report.

Figure 4:
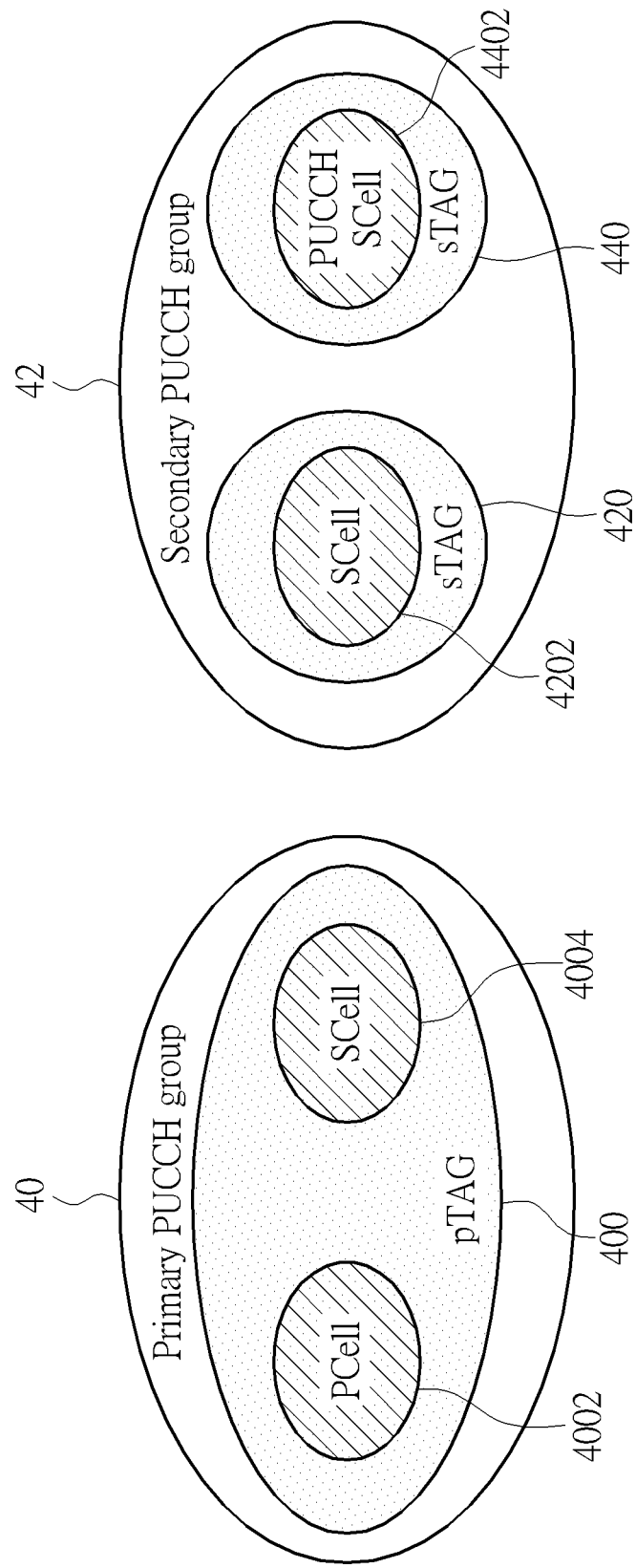
FIG. 4 is a schematic diagram of a carrier aggregation according to an example of the present invention.

FIG. 4 is a schematic diagram of a carrier aggregation according to an example of the present invention. The UE may establish a first UL time alignment with a pTAG 400 including a PCell 4002 and a SCell 4004 of the network, and may start a first TAT for controlling how long the UE determines that the pTAG 400 is UL time aligned. The PCell 4002 and the SCell 4004 belong to a primary PUCCH group 40. The UE may establish a second UL time alignment with a sTAG 420 including a SCell 4202, and may start a second TAT for controlling how long the UE determines that the sTAG 420 is UL time aligned. The UE may establish a third UL time alignment with a sTAG 440 including a PUCCH SCell 4402, and may start a third TAT for controlling how long the UE determines that the sTAG 440 is UL time aligned. In addition, the SCell 4202 and the PUCCH SCell 4402 belong to a secondary PUCCH group 42. In the secondary PUCCH group 42, the UE may be configured to transmit HARQ feedback(s) on the PUCCH SCell 4402 in response to data received on the SCell 4202, and/or may be configured to transmit CSI report (s) on the PUCCH SCell 4402. The CSI report (s) are derived based on measurement (s) on reference signal (s) received on the SCell 4202. In one example, the network may not configure the SCell 4004 to the UE.

The UE flushes all HARQ buffers for all serving cell(s) of the sTAG 440 (i.e. the PUCCH SCell 4402) and releases a PUCCH and a SRS for the all serving cell(s) of the sTAG 440, when the third TAT expires and the first and second TATs don't expire. According to the process 30, the UE releases a PUCCH and a SRS for the SCell 4202 to stop transmitting the HARQ feedback(s) and the CSI report(s) on the PUCCH SCell 4402. Thus, the problem described above is solved. If the UE is not configured a UL transmission on the SCell 4202, the sTAG 420 will not exist and the UE will not have and start the second TAT.

Figure 5:
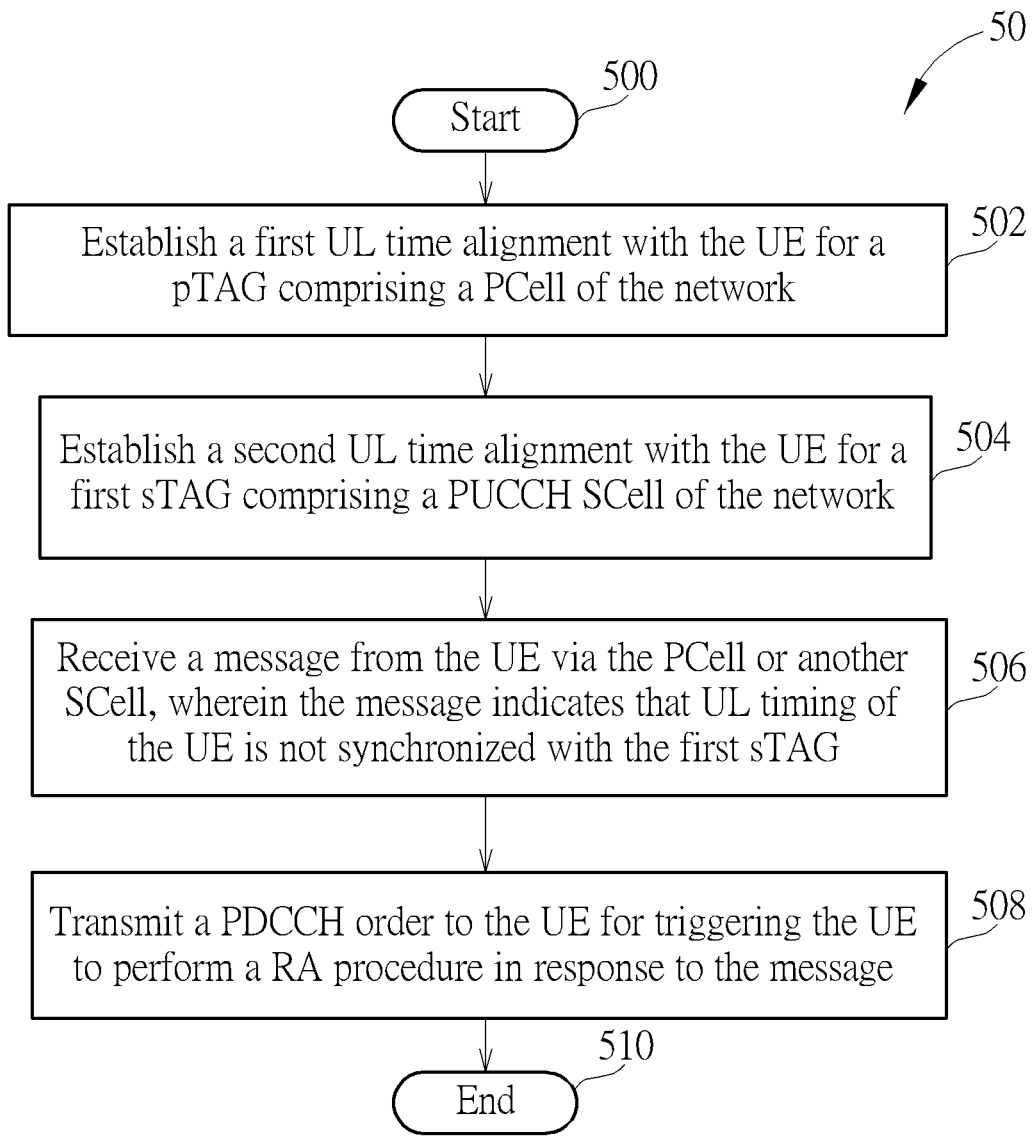
FIG. 5 is a flowchart of a process according to an example of the present invention.

FIG. 5 is a flowchart of process 50 according to an example of the present invention. The process 50 is utilized in a network (e.g., eNB) in FIG. 1, to handle communication operations with a UE in FIG. 1. The process 50 may be compiled into the program code 214 and includes the following steps:

Step 500: Start.

Step 502: Establish a first UL time alignment with the UE for a pTAG comprising a PCell of the network.

Step 504: Establish a second UL time alignment with the UE for a first sTAG comprising a PUCCH SCell of the network.

Step 506: Receive a message from the UE via the PCell or another SCell, wherein the message indicates that UL timing of the UE is not synchronized with the first sTAG.

Step 508: Transmit a PDCCH order to the UE for triggering the UE to perform a RA procedure in response to the message.

Step 510: End.

According to the process 50, the network establishes a first UL time alignment with the UE for a pTAG including a PCell of the network. The network establishes a second UL time alignment with the UE for a first sTAG including a PUCCH SCell of the network. Then, the network receives a message from the UE via the PCell or another SCell, wherein the message indicates that UL timing of the UE is not synchronized with the first sTAG. The network transmits a PDCCH order to the UE for triggering the UE to perform a RA procedure in response to the message. The UE receives a timing adjustment value in a RA response from the network during the RA procedure and applies the timing adjustment value to get UL time aligned with the first sTAG. Thus, a problem that the UL timing is not synchronized with the first sTAG is solved.

Realization of the present invention is not limited to the above description. The following example may be applied to the process 50.

In one example, the PDCCH order may include an identifier corresponding to a dedicated preamble for the UE to perform the RA procedure. The UE transmits the dedicated preamble indicated by the identifier to a cell of the first sTAG for initiating the RA procedure to a cell of the first sTAG in response to the message. The cell may be the PUCCH SCell or a SCell of the first sTAG. Further, the network receives the dedicated preamble from the UE and may transmit a timing adjustment value to the UE for the UE to adjust the UL timing according to the timing adjustment value. In one example, the network may transmit a first RRC message (e.g., RRConnectionReconfiguration) including a cqi-ReportConfigSCell for the PUCCH SCell to configure the UE to report at least one channel quality indicator (CQI), after transmitting the timing adjustment value. In one example, the network may transmit a second RRC message (e.g., RRConnectionReconfiguration) including a cqi-ReportConfigSCell for a SCell which belongs to a secondary PUCCH group of the PUCCH SCell but doesn't belong to the first sTAG (e.g. the SCell belongs to the pTAG or a second sTAG). In one example, the network may transmit a third RRC message (e.g., RRConnectionReconfiguration) including a SoundingRS-UL-ConfigDedicated for the PUCCH SCell to configure the UE to transmit at least one SRS, after transmitting the timing adjustment value. The first, second and third RRC messages may be a same RRC message or different RRC messages. Thus, the UE may start to transmit (e.g., report) the at least one CQI and/or the at least one SRS for the PUCCH SCell and/or for the SCell, after receiving the corresponding RRC message from the network.

Figure 6:
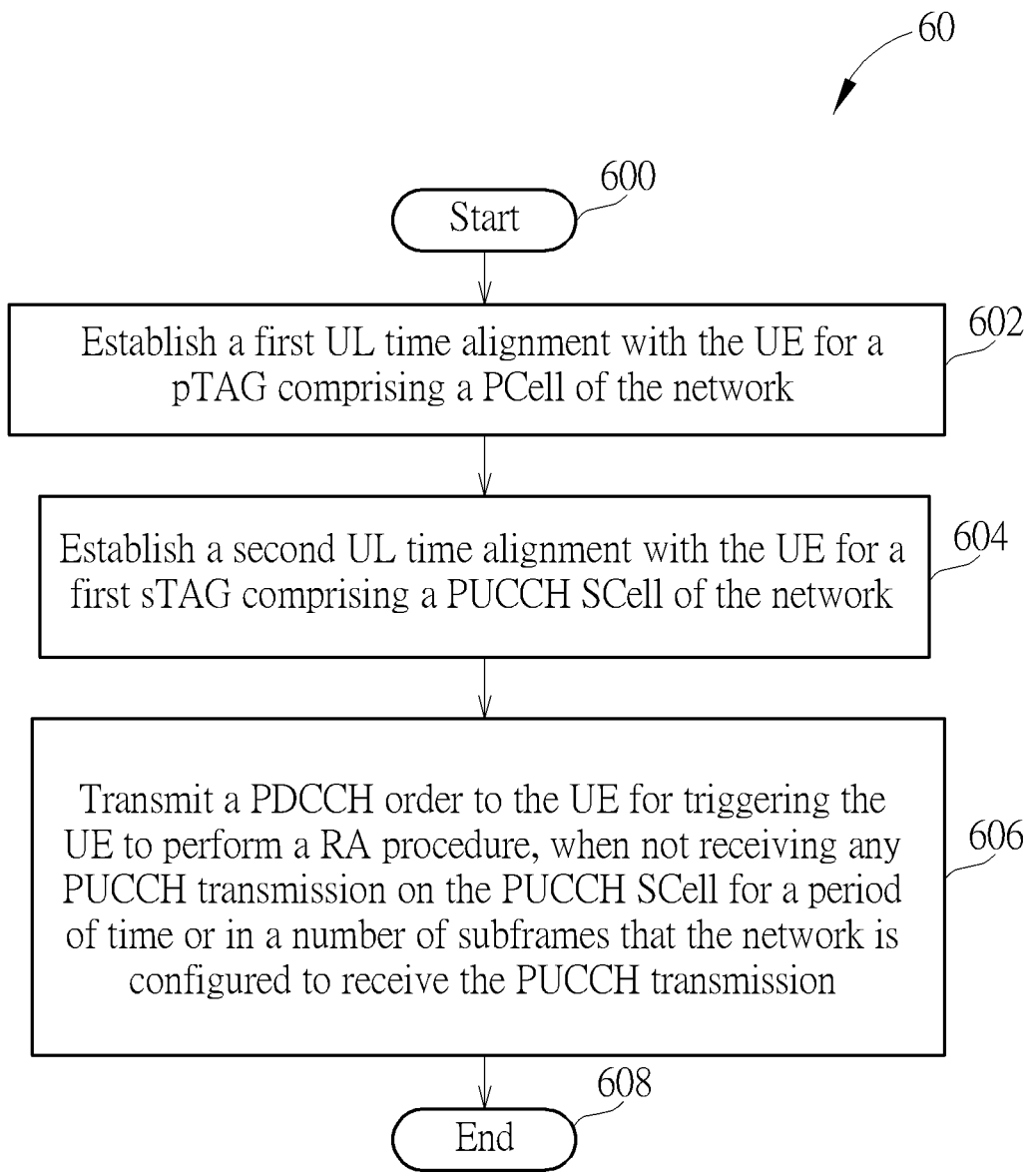
FIG. 6 is a flowchart of a process according to an example of the present invention.
Figure 7:
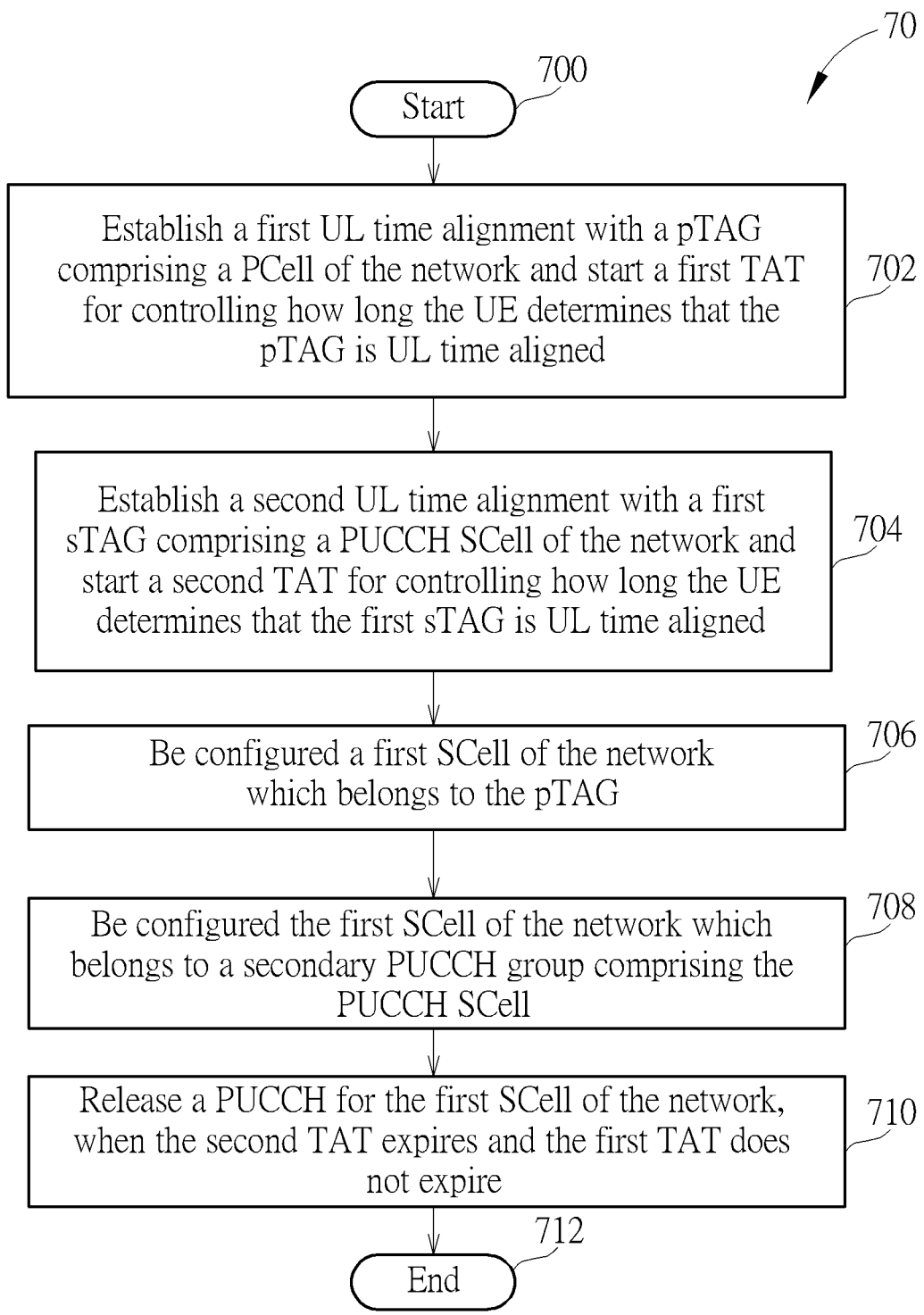
FIG. 7 is a flowchart of a process according to an example of the present invention.

FIG. 6 is a flowchart of process 60 according to an example of the present invention. The process 60 is utilized in a network (e.g., eNB) in FIG. 1, to handle communication operations with a UE in FIG. 1. The process 60 may be compiled into the program code 214 and includes the following steps:

Step 600: Start.

Step 602: Establish a first UL time alignment with the UE for a pTAG comprising a PCell of the network.

Step 604: Establish a second UL time alignment with the UE for a first sTAG comprising a PUCCH SCell of the network.

Step 606: Transmit a PDCCH order to the UE for triggering the UE to perform a RA procedure, when not receiving any PUCCH transmission on the PUCCH SCell for a period of time or in a number of subframes that the network is configured to receive the PUCCH transmission.

Step 608: End.

According to the process 60, the network establishes a first UL time alignment with the UE for a pTAG including a PCell of the network. The network establishes a second UL time alignment with the UE for a first sTAG including a PUCCH SCell of the network. Then, the network transmits a PDCCH order to the UE for triggering the UE to perform a RA procedure, when not receiving any PUCCH transmission on the PUCCH SCell for a period of time or in a number of subframes that the network is configured to receive the PUCCH transmission. That is, the network may determine that UL timing of the UE is not synchronized with the first sTAG, when the network does not receive any the PUCCH transmission on the PUCCH SCell for the period of time or in the number of subframes. Thus, the network may transmit the PDCCH order to indicate the UE to perform the RA procedure to a cell of the first sTAG. The cell may be the PUCCH SCell or a SCell. Thus, a problem that the UL timing is not synchronized with the first sTAG is solved.

Realization of the present invention is not limited to the above description. Examples applied to the process 50 may be applied to the process 60. In addition, the following example may be applied to the process 60.

In one example, the period of time may be a predetermined or fixed value. For example, the period of time may be 20 ms, but is not limited herein. In one example, the number of subframes may be a predetermined or fixed value. For example, the number of subframes may be 5 or 10 subframes, but is not limited herein. Please note that, the subframes may or may not be continuous subframes. For example, the network may expect to receive the PUCCH transmission in subframes 0-5, 8-9. The network may not receive any the PUCCH transmission in the continuous subframes 1-5, when the number of subframes is 5. In another example, the network may not receive any the PUCCH transmission in the non-continuous subframes 0-2, 8 and 9, when the number of subframes is 5. In TDD, DL subframes may or may not be counted in the period of time or the number of subframes.

Those skilled in the art should readily make combinations, modifications and/or alterations on the abovementioned description and examples. The abovementioned description, steps and/or processes including suggested steps can be realized by means that could be hardware, software, firmware (known as a combination of a hardware device and computer instructions and data that reside as read-only software on the hardware device), an electronic system, or combination thereof. An example of the means may be the communication device 20.

To sum up, the present invention provides a device and a method for handling communication operations with a network. Thus, conflict of communication operations between the communication device and the network because UL timing of the communication device is not synchronized with a sTAG is solved.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A communication device for handling communication operations with a network, comprising:
   a storage device; and
   a processing circuit, coupled to the storage device, wherein the storage device stores, and the processing circuit is configured to execute instructions for:
   establishing a first uplink (UL) time alignment with a primary timing advance group (pTAG) comprising a primary cell (PCell) of the network and starting a first time alignment timer (TAT) for controlling how long the communication device determines that the pTAG is UL time aligned;
   establishing a second UL time alignment with a first secondary TAG (sTAG) comprising a physical UL control channel (PUCCH) secondary cell (SCell) of the network and starting a second TAT for controlling how long the communication device determines that the first sTAG is UL time aligned; and
   releasing a first cqi-ReportConfigSCell configuration for a first SCell of the network and flushing all first HARQ buffers for all serving cell(s) of the first sTAG, when the second TAT expires and the first TAT does not expire;
   wherein the first SCell is configured to belong to the pTAG, and the first SCell is configured to belong to a secondary PUCCH group comprising the PUCCH SCell.

2. The communication device of claim 1, wherein the instructions further comprise:
   performing a first random access (RA) procedure via a cell of the network in the first sTAG to establish the second UL time alignment with the network for the first sTAG; and
   starting the second TAT when receiving a first timing advance command in response to the first RA procedure.

3. The communication device of claim 1, wherein the instructions further comprise:
   releasing a second cqi-ReportConfigSCell configuration and
   a SoundingRS-UL-ConfigDedicated configuration for each of the all serving cell(s) of the first sTAG.

4. The communication device of claim 1, wherein the instructions further comprise:
   transmitting a message to the network, wherein the message indicates that UL timing of the communication device is not synchronized with the first sTAG.

5. The communication device of claim 1, wherein the instructions further comprise:
   determining that the second TAT expires, when the first TAT expires and the second TAT does not expire;
   flushing all second HARQ buffers for all serving cell(s) of the pTAG;
   releasing a third cqi-ReportConfigSCell configuration and a sounding reference signal (SRS) for each of the all serving cell(s) of the pTAG; and
   releasing a fourth cqi-ReportConfigSCell configuration and a SoundingRS-UL-ConfigDedicated configuration for each of the all serving cell(s) of the first sTAG.

6. The communication device of claim 5, wherein the instructions further comprise:
   releasing a schedulingRequestConfig for the PUCCH SCell, if the communication device is configured with the schedulingRequestConfig for the PUCCH SCell.

7. A method for a communication device to handle communication operations with a network, comprising:
   establishing a first uplink (UL) time alignment with a primary timing advance group (pTAG) comprising a primary cell (PCell) of the network and starting a first time alignment timer (TAT) for controlling how long the communication device determines that the pTAG is UL time aligned;
   establishing a second UL time alignment with a first secondary TAG (sTAG) comprising a physical UL control channel (PUCCH) secondary cell (SCell) of the network and starting a second TAT for controlling how long the communication device determines that the first sTAG is UL time aligned; and
   releasing a first cqi-ReportConfigSCell configuration for a first SCell of the network and flushing all first HARQ buffers for all serving cell(s) of the first sTAG, when the second TAT expires and the first TAT does not expire;
   wherein the first SCell is configured to belong to the pTAG, and the first SCell is configured to belong to a secondary PUCCH group comprising the PUCCH SCell.

8. The method of claim 7, further comprising:
   performing a first random access (RA) procedure via a cell of the network in the first sTAG to establish the second UL time alignment with the network for the first sTAG; and
   starting the second TAT when receiving a first timing advance command in response to the first RA procedure.

9. The method of claim 7, further comprising:
   releasing a second cqi-ReportConfigSCell configuration and a SoundingRS-UL-ConfigDedicated configuration for each of the all serving cell(s) of the first sTAG.

10. The method of claim 7, further comprising:
    transmitting a message to the network, wherein the message indicates that UL timing of the communication device is not synchronized with the first sTAG.

11. The method of claim 7, further comprising:
    determining that the second TAT expires, when the first TAT expires and the second TAT does not expire;
    flushing all second HARQ buffers for all serving cell(s) of the pTAG;
    releasing a third cqi-ReportConfigSCell configuration and a sounding reference signal (SRS) for each of the all serving cell(s) of the pTAG; and
    releasing a fourth cqi-ReportConfigSCell configuration and a SoundingRS-UL-ConfigDedicated configuration for each of the all serving cell(s) of the first sTAG.

12. The method of claim 11, further comprising:
    releasing a schedulingRequestConfig for the PUCCH SCell, if the communication device is configured with the schedulingRequestConfig for the PUCCH SCell.

* * * * *